Nov. 3, 1959     O. C. G. WENNBERG     2,911,020
LOG-PEELING MACHINE HAVING SCRAPER TOOLS
PROVIDED WITH BARK-DEFLECTING WINGS
Filed Jan. 22, 1953
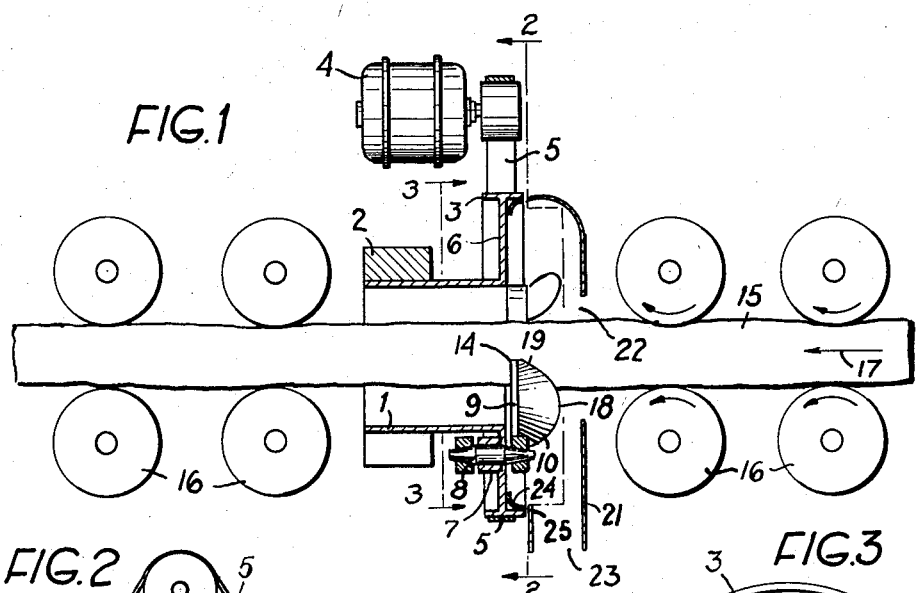
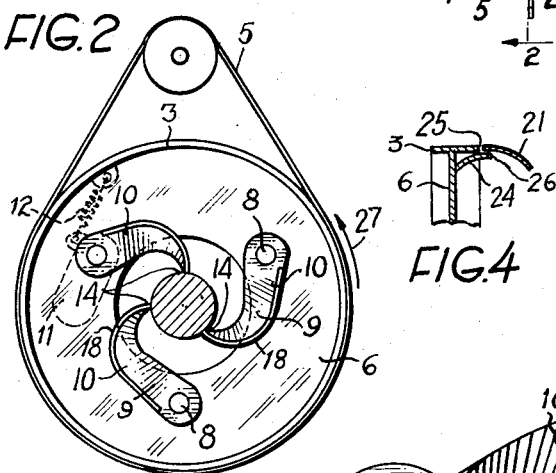
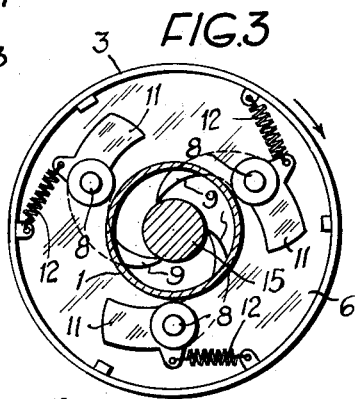
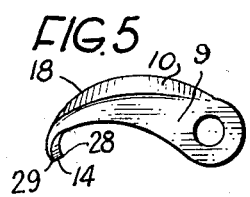
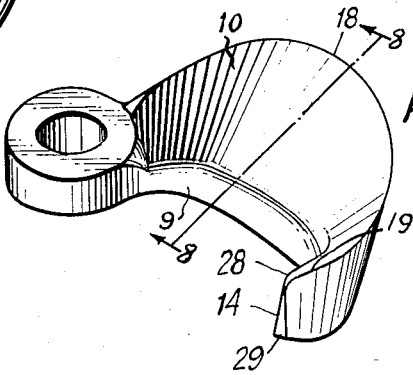
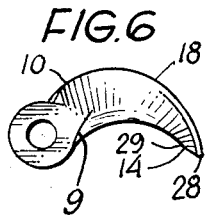
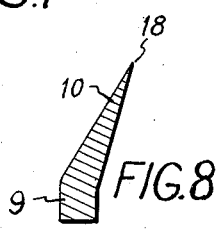
INVENTOR
Olov C. G. Wennberg
BY
*Young, Envoy & Thompson* ATTORNEYS

2,911,020

LOG-PEELING MACHINE HAVING SCRAPER TOOLS PROVIDED WITH BARK-DEFLECTING WINGS

Olov Carl Gustav Wennberg, Karlstad, Sweden

Application January 22, 1953, Serial No. 332,587

Claims priority, application Sweden January 31, 1952

5 Claims. (Cl. 144—208)

The present invention refers to such bark-peeling machines for logs which consist of a rotating drum having the logs passing therethrough, and wherein the drum is provided with a number of arms actuated by springs and/or counterweights, said arms being formed as scraping members or carrying special bark-peeling tools. The invention has for its object to provide a suitable construction and arrangement of the arms, so that the feeding of the logs into the machine is facilitated and the bark peeled or scraped off is cleared out of the way in a suitable manner.

A particular object is to provide a bark-peeling device, in which the arms form wings or blades of such configuration and with such an oblique scraping edge that they will convey the scraped-off peel from the scraping edge outwardly and laterally against the feeding direction of the log. Thus, the wings or blades may have the edge thereof facing the feeding-in end of the machine formed as an arc extending first rearwardly from the mounting end of the arm, then along a line directed obliquely forwardly (considering the feeding direction of the log as the forward direction) and inwardly to the scraping end of the arms. By reason of this construction of the arms they will screw themselves up along the log in the feeding-in of the latter, when the end of the log meets the projecting arcuate edge of the wings, said edge then sliding along the margin of the end of the log, so that the scraping edge proper will be moved out to the periphery of the log to commence the peeling of the bark immediately at the end of the log in an effective manner. For this reason no bark need remain adjacent the end of the log.

The log-facing surface of the wing may extend from the rearwardly curved edge obliquely forwards and inwards toward the arm proper, so that the bark peeled off will be guided outwardly and against the feeding direction of the log. This involves the advantage that the bark shavings can be readily collected in a surrounding housing.

Further features characteristic of the invention will appear from the following description of a form of embodiment illustrated in the accompanying drawing by way of diagrammatic representation. Fig. 1 shows a vertical projection of the machine with the drum in axial section. Fig. 2 is an endwise view of the drum on the broken line 2—2 in Fig. 1, and Fig. 3 is a cross section on line 3—3 in Fig. 1. Fig. 4 shows a detail of a fan housing in section. Figs. 5 and 6 show the scraping arm in two opposite lateral projections, Fig. 7 is a perspective view of said arm and Fig. 8 is a cross-sectional view taken on line 8—8 of Fig. 7.

In the drawing, 1 designates a drum carried by a bearing contrivance 2 and provided with a driving wheel 3 connected to a driving motor 4 by means of a transmission belt 5. The driving wheel forms a radial flange 6 provided with bearings 7 for stub shafts 8 with conical journals. Keyed onto one end of each stub shaft 8 is an arm 9 provided with a wing 10, while the other end of the stub shaft carries a counterweight 11 also keyed to said shaft. The counterweight 11 is connected by means of a spring 12 to the driving wheel 3, preferably at the periphery thereof. The springs and counterweights tend to turn the stub shafts 8 so that the arms 9 are kept with their ends in engagement with the log 15, said ends being formed into or provided with scraping edges 14. 16 denotes feed rollers belonging to feeding frames arranged at the feeding-in end and the discharging end of the machine. The feeding direction of the log is indicated by an arrow 17.

The wings 10 have the edge thereof facing the feeding-in end of the machine formed as an arcuate or compound curve 18 extending first rearwardly from the mounting end of the arms 9, and then obliquely forwardly (considering the feeding direction of the log as the forward direction) and inwardly as at 19 to the scraping end 14 of the arms. From the arcuate edge the wing has a log-facing surface that slopes forwards and inwards toward the arm proper, whereby it will deflect the scraped-off bark in a suitable manner.

The wings are surrounded by a stationary housing, which may be formed as a fan housing 21 with an inlet opening 22 for the air and an outlet conduit 23 for bark and air. The flange 6 of the driving wheel 3 may have an arcuate wall 24 arranged thereon, which forms a continuation of the fan housing at an opening edge 25 of the latter. The opening edge merges into the peripheral portion of the driving wheel, and the wall 24 may, if desired, project with an edge portion 26 inside the opening edge 25 and overlap the latter to provide for a sealing effect, as shown in Fig. 4.

The scraping member may broadly be of the detail construction shown in Figs. 5–7. The scraping edge 14, which is preferably somewhat angularly set to a line paralleling the swinging axis (the stub shaft 8) of the scraping arm, may merge into the edge of the wing on the side where the wing is arranged with a rather obtuse, perhaps rounded corner 28, whereas said scraping edge forms a sharper corner 29 on the flat opposite side of the arm. The more obtuse corner 28 faces an oncoming log and is thus the first to attack the bark. The scraping edge 14 is bevelled down toward the flat side of the arm as shown in Fig. 7, and by reason of this feature the edge will be prevented from penetrating too deeply, so that the surface wood is spared. In other words, the scraping edge is beveled down to form a substantially isosceles triangular surface, the scraping edge forming one of the equal legs of the isosceles triangle, and the scraping edge and the unequal leg of the triangle coinciding with the sharp angle.

When the drum rotates during the feeding of a log therethrough the bark will be peeled off. The peeled-off bark moves along the log-facing surfaces of the wings and is guided by the same toward the unbarked portion of the log and into the fan housing 21. In this fan housing the wings create an air current which entrains the bark and blows the same out through the outlet 23. The counterweights 11 and the springs 12 provide for the requisite bearing pressure between the scraping edges and the log. Inasmuch as the counterweights and springs are located outside the fan housing and are separated from the wings by the flange 6, they will not prevent the removal of the peeled-off bark.

What I claim is:

1. In a log-peeling machine, a bark-scraping device comprising a rotary drum, means to feed a log to be peeled axially through said drum, arms provided with scraping edges for engagement with such a log, each of said arms being formed as a bark-deflecting wing or blade having a lateral edge facing the feeding-in end of the device and formed as a projecting arc extending from the scraping end of the arm outwardly and rearwardly with respect to the feeding direction of a log, said wings being concave toward the feeding-in end of the device, means to apply the scraping edge of the arms into yielding engagement with a log being peeled, and a stationary housing to receive scraped-off bark on the feeding-in side of the scraping device.

2. A bark-scraping tool for log-peeling machines formed as an arm with a lateral bark-guiding wing and at one end thereof with a scraping edge limited at its ends by the lateral surfaces of the arm, one end corner between said edge and one of said lateral surfaces being rounded and the other end corner forming a relatively sharp angle, the edge proper being bevelled down to form a substantially isosceles triangular surface, the scraping edge forming one of the equal legs of the isosceles triangle, and the scraping edge and the unequal leg of the triangle coinciding with the sharp angle corner.

3. A bark-scraping tool as claimed in claim 2 and further comprising a journal portion adapted to carry the tool in a log-peeling machine in a position having the rounded corner facing the feeding-in end of the machine.

4. In a log-peeling machine, a bark-scraping device comprising a rotary drum, means to feed a log to be peeled axially through said drum, arms provided with scraping edges for engagement with a log being peeled, said arms forming fan blades, a stationary fan housing surrounding the fan blades and defining an opening toward the drum, said drum being provided with a wall forming a continuation of the wall of the fan housing while overlapping the opening edge thereof for sealing purposes, and means to apply the scraping edges of the arms into yielding engagement with a log being peeled.

5. In a log-peeling machine, a bark-scraping device comprising a rotary drum, means to feed a log to be peeled axially through said drum, arms provided with scraping edges for engagement with such a log, said arms being formed as bark-deflecting wings or blades having a lateral edge facing the feeding-in end of the device and formed as a projecting arc extending from the scraping end of the arm outwardly and rearwardly with respect to the feeding direction of a log, said wings being concave toward the feeding-in end of the device, means to apply the scraping edge of the arms into yielding engagement with a log being peeled, the log-facing surface of the wing extending from the rearwardly and outwardly curved lateral edge to an opposite lateral edge of the arm and sloping towards such a log in a direction obliquely forward with respect to the feeding direction, whereby scraped-off bark will be guided outwardly and rearwardly over an unbarked portion of such a log, and a stationary housing to receive scraped-off bark on the feeding-in side of the scraping device.

References Cited in the file of this patent

UNITED STATES PATENTS

| | | |
|---|---|---|
| 1,248,700 | Olson | Dec. 4, 1917 |
| 2,448,689 | Schnyder | Sept. 7, 1948 |
| 2,581,829 | Alexander | Jan. 8, 1952 |
| 2,623,558 | Andersson | Dec. 30, 1952 |
| 2,692,623 | Leffler | Oct. 26, 1954 |

FOREIGN PATENTS

| | | |
|---|---|---|
| 31,052 | Sweden | June 23, 1911 |
| 67,469 | Sweden | June 4, 1929 |
| 151,988 | Australia | Jan. 11, 1951 |
| 436,638 | Italy | June 14, 1948 |